United States Patent [19]

Krause

[11] 4,165,531

[45] Aug. 21, 1979

[54] DATA GENERATOR FOR DISC FILE ADDRESSES

[75] Inventor: Peter L. Krause, Thousand Oaks, Calif.

[73] Assignee: Burroughs Corporation, Detroit, Mich.

[21] Appl. No.: 789,395

[22] Filed: Apr. 21, 1977

Related U.S. Application Data

[63] Continuation of Ser. No. 220,397, Jan. 24, 1972, abandoned, which is a continuation of Ser. No. 866,502, Oct. 15, 1969, abandoned.

[51] Int. Cl.² ............................................. G06F 13/04
[52] U.S. Cl. .................................................. 364/200
[58] Field of Search ... 364/200 MS File, 900 MS File; 360/49, 51; 235/92 PE

[56] References Cited

U.S. PATENT DOCUMENTS

| | | | |
|---|---|---|---|
| 2,926,338 | 2/1960 | Bensky | 360/51 |
| 3,355,718 | 11/1962 | Talarczyk | 364/200 |
| 3,375,507 | 3/1968 | Gleim | 360/49 |
| 3,416,140 | 12/1968 | Cassidy, Jr. | 364/900 |
| 3,490,006 | 1/1970 | Macon | 364/200 |
| 3,562,719 | 2/1971 | Hynes | 364/200 |
| 3,573,743 | 4/1971 | Hadd | 364/200 |
| 3,631,421 | 12/1971 | Perkins | 360/49 |

*Primary Examiner*—James D. Thomas
*Attorney, Agent, or Firm*—Nathan Cass; Kevin R. Peterson; Edward J. Feeney, Jr.

[57] ABSTRACT

A computer is programmed to generate addresses for recordation in the address track of a rotating disc file memory at predetermined intervals of space. Clock pulses are generated synchronized with the rotation of the disc. The clock pulses are applied to the computer to time the execution of the program so the addresses generated by the computer are synchronized to the rotation of the disc. The generated addresses are recorded in the address track of the disc as it rotates. A clock pulse counter set by instructions of the program controls the spacing between address data items. Address data can be recorded in the address track at different densities with the same program. The computer memory has a replaceable read-only section in which the program is stored. Different address formats are generated by changing the read-only section.

3 Claims, 5 Drawing Figures

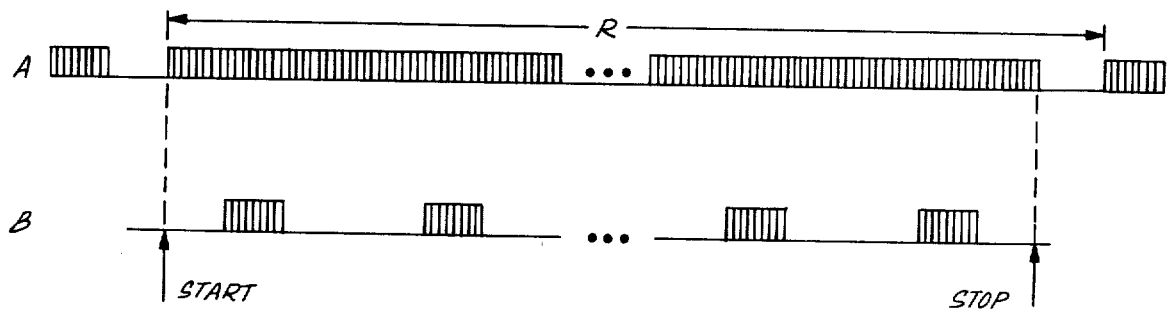
FIG. 3
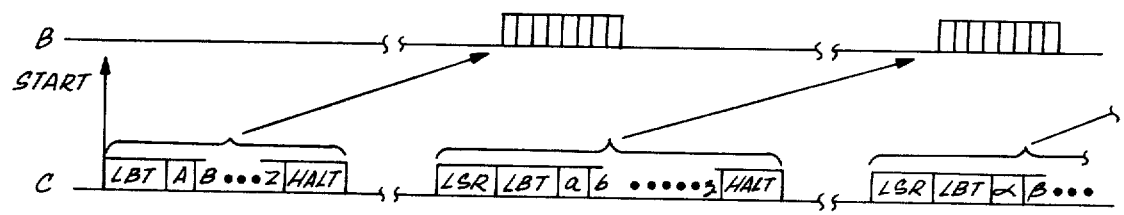
FIG. 4
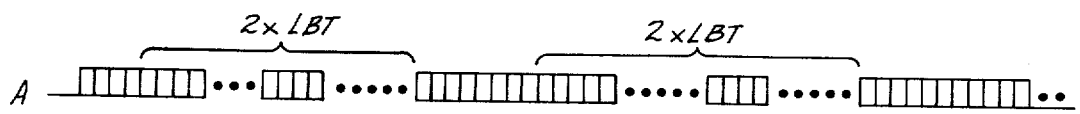
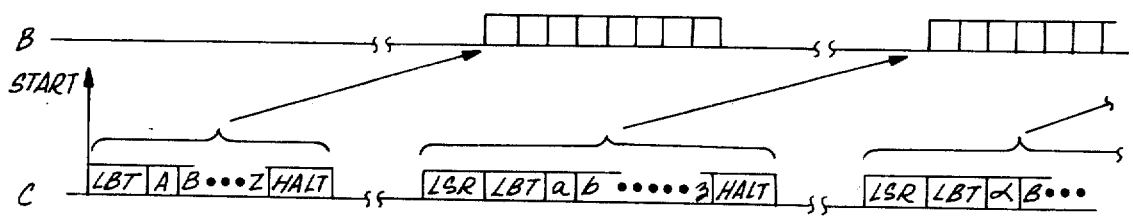
FIG. 5

DATA GENERATOR FOR DISC FILE ADDRESSES

CROSS-REFERENCE TO RELATED APPLICATIONS

This is a continuation of application Ser. No. 220,397, filed Jan. 24, 1972, now abandoned, which is in turn a continuation of now abandoned application Ser. No. 866,502, filed Oct. 15, 1969.

BACKGROUND OF THE INVENTION

This invention relates to data generation and, more particularly, to the generation of data in groups separated from one another by long intervals.

There are some applications in the data handling field for data to be generated in groups separated from one another by long intervals of time. One such application is the recordation of address data in the address track of a disc file memory system. Items of address data that identify different circumferential segments of an information zone on the face of a disc are recorded in the address track at known positions spaced around the circumference. Between the beginning of the segments of the information zone, no data is usually recorded in the address track.

In the past, all the address data to be recorded on the face of a disc file has conventionally been stored in a memory unit from which each address data item is taken in turn and recorded in the address track of the disc at the proper place. A substantial memory capacity is required to store all the address data items, and it is difficult to coordinate the placement of these items at the desired positions in the address track. The present trend is to build disc file memory systems having a plurality of discs capable of storing information on both faces in a plurality of information zones with different bit periods. Thus, there are presently available disc file systems having as many as 24 individual information zones. Each such information zone requires its own address track with address data items. Sometimes there is imposed a requirement that the address data items uniquely identify various segments of the information zones and distinguish them from all the other segments of the entire disc file system. Further, it is common practice to use various address formats for different disc file models, even different models manufactured by the same company. These factors further increase the demands on the memory that stores the address data prior to recordation on the discs and also intensify the problems associated with the proper placement of the address data in the address tracks of the discs.

SUMMARY OF THE INVENTION

The invention contemplates the use of a computer that is programmed to generate addresses for recordation in the address track of a physically moving information storage system such as a disc file memory system at predetermined intervals of space. Clock pulses are generated synchronized with the rotation of the disc. The clock pulses are applied to the computer to time the execution of the program so the address data items generated by the computer are synchronized to the rotation of the disc. As each address data item is generated by the computer, it is recorded in the address zone. Thus, the address data items are generated while the disc is rotating at its normal operating speed, each address data item being generated in turn immediately preceding the time at which it is recorded in the address track in accordance with the desired format. Memory is only required to carry out the computer functions and to store the program. A substantial reduction in the memory capacity required to generate the addresses ensues. Moreover, since the program is executed under the control of the clock pulses, it is ensured that the address data items are recorded in the address track at a density related to the rotation of the disc and are precisely placed in the proper position in the address track.

An important feature of the invention is the control of the computer so it records address data items in an address track at predetermined intervals of space despite unknown execution times for the portions of the program that generate any single address item. A number of conditional branches may occur in the portion of the program that generates any one address data item. Branch lengths could be equalized with "no operation" instructions which use up execution time without performing any operation. It is difficult to forecast the precise length of each of these branches so they may be connected by no operation instructions until the time at which the generation of the next address data item begins. The large number of no operation instructions in a number of conditional branches needlessly consumes space in the computer memory. To avoid this problem, instead of using "no operation" instructions, all the instructions comprising the program that generates the addresses for the entire address track are arranged in sequence. There is associated with the instructions for each address data item, an initial instruction to count a predetermined number of clock pulses that is greater than the maximum number of clock pulses required to execute the instructions generating such address data item, and a final instruction to halt the execution of the sequence. The instructions following the initial instruction are executed in turn to generate an address data item and the computer then halts responsive to the final instruction. Thereafter, the computer begins once again when the predetermined number of clock pulses represented by the initial instruction are counted. Each address data item is then recorded in the address track on the face of the disc responsive to the end of the count of the predetermined number of clock pulses. Preferably, there is associated with the instructions for each address a register loading instruction that immediately precedes in the sequence the initial instruction for the following address. On the occurrence of the register loading instruction, the previously generated address data item is loaded in a register. After a predetermined number of clock pulses, the address data item is shifted out of the register responsive to the clock pulses one bit at a time to the recording head for the address track. This feature of the invention is not limited to the generation of address data for a moving information storage medium; it could be utilized in any application where data is generated in groups separated from one another by long intervals.

The density of the address data that is recorded in the address track can be varied without changing the speed of operation of the computer. Clock pulses are coupled to the shift register and the counter associated with the initial instruction through a variable frequency divider. Thus, the counter and the shift register operate at a submultiple of the clock pulse frequency.

Another feature of the invention is the storage of the program for an address format in a replaceable section of the computer memory. The program portion of the memory is indestructible, i.e., it is a read-only section. To change the address format, one read-only section is simply replaced with another having an appropriate program. Therefore, the address data generator is compatible with different models and makes of disc file systems.

BRIEF DESCRIPTION OF THE DRAWINGS

The features of a specific embodiment of the best mode contemplated of carrying out the invention are illustrated in the drawings, in which:

FIGS. 3, 4 and 5 are diagrams depicting the positional relationship on a disc between clock pulses, address data, and program instructions in the address data generator of FIG. 1.

DETAILED DESCRIPTION OF THE SPECIFIC EMBODIMENT

Figure 1:
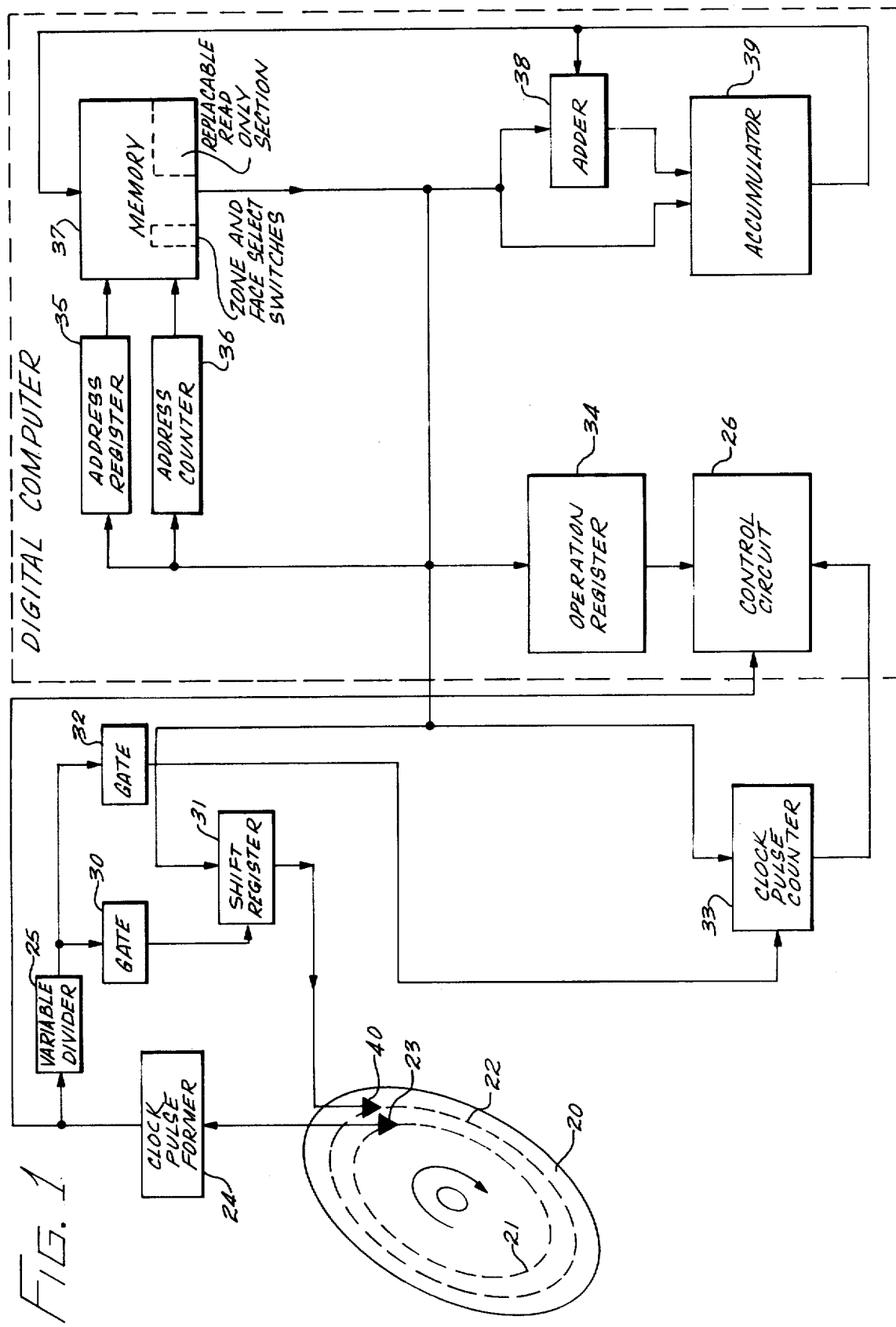
FIG. 1 is a schematic diagram of an address data generator that incorporates the principles of the invention.

Reference is made to FIG. 3, in which diagram A represents the clock pulses recovered from the clock track of a disc file memory system as a function of the circumferential, i.e., angular position on the disc, and diagram B represents binary coded address data to be recorded in the corresponding address track of the disc as a function of the circumferential position on the disc. Since the disc is rotating continuously at substantially constant angular velocity, diagrams A and B also represent a time function. As depicted in diagram A, the clock pulses are spaced at substantially equal time intervals. A gap in the clock pulses is provided over a short portion of the circumference of the clock track, as depicted in diagram A, to designate a starting point for the address data in the address track of the disc. One revolution of the disc is represented in diagram A by the distance R. As depicted in diagram B, address data is to be recorded on the disc in the address track in groups, hereafter called address data items, separated from one another by long intervals. The address data is to be recorded in the address track at the same bit frequency as the clock pulses, as illustrated in FIG. 3, or at a submultiple of the clock pulse bit frequency, as illustrated in FIG. 5. As depicted by the start and stop arrows in diagram B of FIG. 3, the recordation of the address data items in the address track starts and stops a predetermined number of clock pulses from the boundaries of the gap in the clock pulses. Similarly, each address data item in turn is recorded in the address track a precise number of clock pulses from the gap in the clock pulses. In summary, the address data is to be recorded at precisely determined positions and density in the address track relative to corresponding clock pulses in the clock track.

Reference is made to FIG. 4 in which diagram A represents the clock pulses recovered from the clock track of a disc file memory system during only a portion of one disc revolution and which are synchronized with the rotation of the disc. Diagram B represents the address data items to be recorded in the address track of the disc during the same portion of a revolution; and diagram C represents the instructions of the computer program that are executed during the same portion of a revolution. The invention utilizes a computer that is programmed to generate addresses for recordation in the address track of the disc at predetermined intervals of space. As the disc rotates, the instructions comprising the program generate each address data item in turn immediately before the time at which such address data item is to be recorded in the address track. The clock pulses recovered from the disc time, i.e., control, the execution of the instructions, all of which are stored in sequence in the computer. In diagram C, the instructions for generating three consecutive address data items are respectively depicted under three brackets with arrows pointing to the corresponding binary coded address data items in diagram B generated thereby.

After the start of the computer responsive to the first clock pulse after the gap, the first instruction to be executed is designated LBT in diagram C. Responsive to the LBT instruction, a predetermined number of clock pulses recovered from the clock track are counted. The individual instructions that compute the first address data item which are designated A, B, ... Z, follow the LBT instruction in uninterrupted sequence. A HALT instruction follows the Z instruction in sequence. Responsive to the HALT instruction, the computer temporarily stops executing the sequence of instructions. To summarize, the computer first begins to count a predetermined number of clock pulses responsive to the LBT instruction, then while such count is in progress computes the first address data item responsive to instructions A, B, ... Z, and finally stops temporarily responsive to the HALT instruction.

The computer remains stopped until the predetermined number of clock pulses are counted pursuant to the LBT instruction. At such time, the execution of the sequence of instructions resumes. As depicted in diagram C, the next instruction is designated LSR. Responsive to the LSR instruction, the first address data item is loaded from the computer memory into a shift register and then shifted serially out of the shift register responsive to successive clock pulses recovered from the clock track.

A counter is set to a start that represents the predetermined number of clock pulses responsive to the LBT instruction. Immediately following the LBT instruction, the counter begins to advance responsive to successive clock pulses and reaches its end state when the predetermined number of clock pulses have occurred. The brackets marked LBT in diagram A designate this predetermined number of clock pulses. As depicted by diagram A, the sum of the number of clock pulses required to execute the LBT instruction, to advance the counter to its end state, and to execute the LSR instruction is a known quantity. Thus, the position of the first address data item in the address track relative to the first clock pulse in the clock track after the gap is precisely determined. For example, in the diagram, the first address data item begins after the predetermined number of clock pulses represented by the LBT instruction, plus eight clock pulses.

Immediately following the execution of the LSR instruction, the initial instruction for generating the second address data item, i.e., the second LBT instruction, is executed as depicted in diagram C. Responsive to the second LBT instruction, a predetermined number of clock pulses recovered from the clock track are again counted. Immediately after the execution of the second LBT instruction, the instructions for generating the second address data item, designated a, b, ... z, are executed in uninterrupted sequence. Then, the execution of the instructions is temporarily stopped again, responsive to the next HALT instruction, until the counter is advanced to its end state at which time the second address data item is loaded into the shift register responsive to the second LSR instruction.

Each address data item is generated in the described manner as the disc rotates. At the end of the group of instructions for generating one address data item, the execution of instructions is temporarily halted until the counter is advanced to its end state. Thus, irrespective of the time required to execute the instructions that generate any particular address data item, the operation of the computer halts responsive to a single halt instruction after such address data item is generated, and resumes again at a point that is determined by the preceding LBT instruction. Of course, the predetermined number of clock pulses represented by the LBT instruction must be greater than the maximum number of clock pulses required to generate any of the address data items.

Reference is made to FIG. 5, in which diagram A represents the clock pulses recovered from the clock track of a disc file memory system during only a portion of one disc revolution; diagram B represents the address data items to be recorded in the address track of the disc during the same portion of the revolution at a lower data density than the clock pulses; and diagram C represents the instructions of the computer program that are executed during the same portion of a revolution. The density of the address data in the address track is controlled by applying clock pulses at a submultiple of their bit frequency to the clock pulse counter and the shift register. In FIG. 5, it is assumed that the submultiple is one-half. Thus, as depicted in diagram B, the address data bit periods are twice the duration of the clock pulse bit periods and the interval between address data items is more than twice as great as the predetermined number of clock pulses represented by the LBT instruction. In contrast thereto, as depicted by diagram C, the instructions are executed responsive to the clock pulses at their original bit frequency. Therefore, the time required to generate each address data item remains unchanged despite the change in the density at which the address data items are recorded and the space between address data items.

Figure 2:
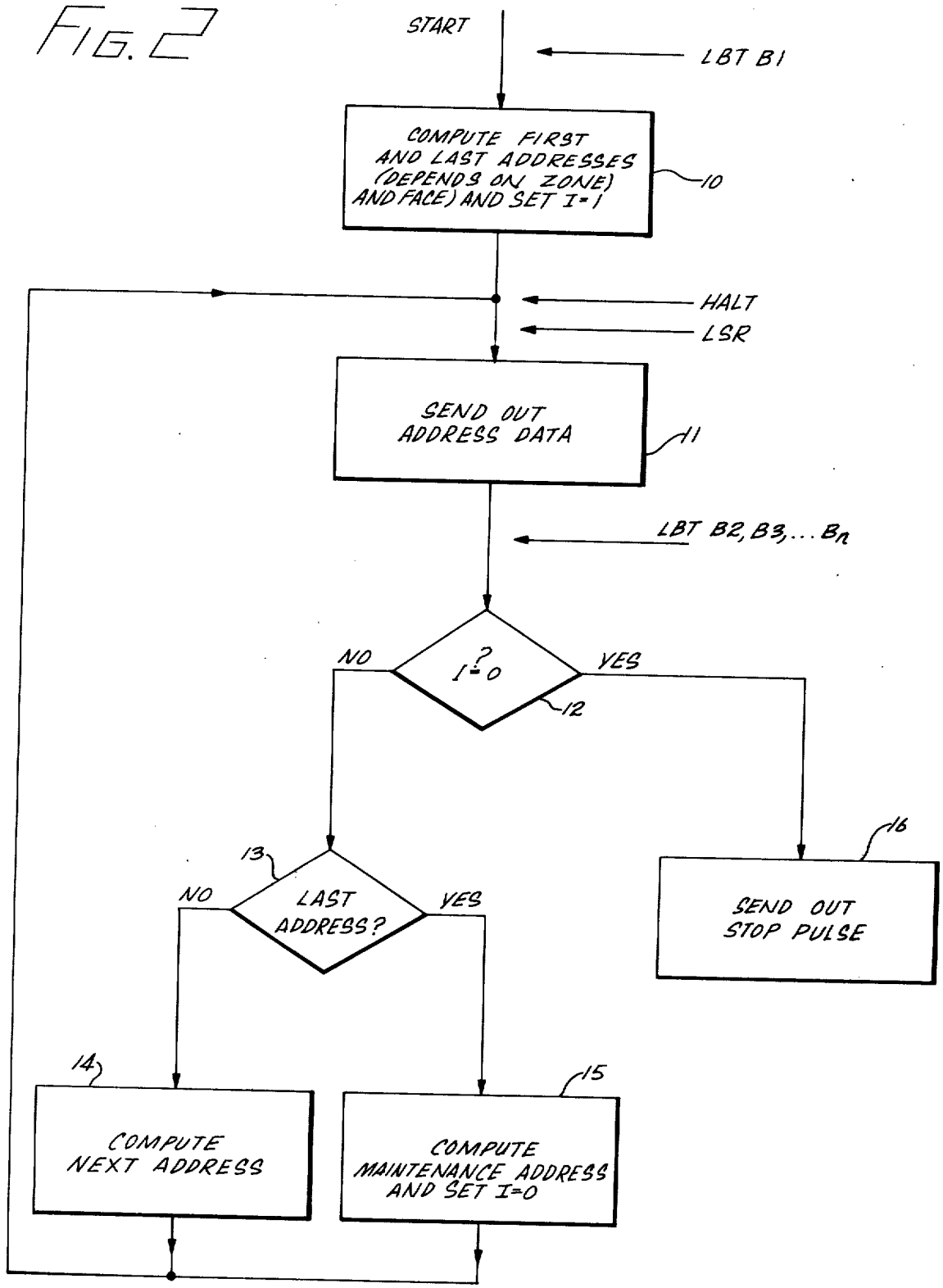
FIG. 2 is a flow diagram of an exemplary program for generating all the address data to be recorded in an address track with the digital computer of FIG. 1.

Reference is made to FIG. 2 for a flow diagram of a computer program suitable for generating a complete set of addresses in an address track according to the invention. Upon the occurrence of the computer start command, the first and last addresses in the address track are computed and a memory word designated I is set to one, as represented by a block 10. In the case of a disc file unit having a plurality of faces and information zones with different bit frequencies, the first and last addresses to be computed depend upon the zone and face in which the address track is located. Therefore, the first and last addresses are computed on the basis of inputs designating the zone and face involved. As represented by the horizontal arrow above block 10, the LBT instruction is executed prior to the actual computation of the first and last addresses. The symbol B1 next to this arrow represents the address in the computer memory of the predetermined number of clock pulses to which the clock pulse counter is initially set. Thus, the clock pulse counter advances responsive to each recovered clock pulse, while the first and last addresses are being computed. After the computation of the first and last addresses is completed, a HALT instruction is executed as indicated by the horizontal arrow under block 10.

When the clock pulse counter reaches its end state, the computer again begins to execute instructions. As represented by block 11, the computed address data, i.e., the first address, is sent out pursuant to the LSR instruction, represented by the horizontal arrow above block 11. Thereafter, as represented by the horizontal arrow under block 11, the next LBT instruction is executed and the clock pulse counter is set to the predetermined number of clock pulses stored in the computer memory at address B2. The clock pulse counter is again advanced responsive to each clock pulse. At a diamond 12, the value of I is compared with zero. Since I is not zero, the NO branch is taken.

In this branch, a comparison is made, as depicted by a diamond 13, between the last address, which was initially computed in accordance with block 10, and the sent out address. If the sent out address is different from the last address, which is the case with the first address, the NO branch is executed. In this branch, the next address is computed, as represented by a block 14. Thereafter, the execution of the program halts, as represented by the horizontal arrow below block 10. When the clock pulse counter reaches its end state, the next address is sent out, as represented by block 11. The cycle is then repeated, each address being computed in turn until the comparison taking place in diamond 13 indicates that the last address has been computed. At this point the YES branch from diamond 13 is executed. As represented by a block 15, in this branch a maintenance address is computed, I is set to zero, and the program then halts. The maintenance address is conventionally used for testing purposes, not to identify a segment of the information zone. After the clock pulse counter reaches its end state the next time, the maintenance address is sent out, as represented by block 11. Since I is zero, the YES branch is taken from diamond 12. In this branch, a stop command is generated and sent out, as represented by a block 16, to signify that all the addresses have been recorded in the address track.

In FIG. 1, a continuously rotating disc is shown having a face 20 coated with magnetic material. The disc is part of a disc file memory system. Face 20 has a clock track 21 represented by a dashed circle, an address track 22 also represented by a dashed circle, and an information zone having a plurality of information tracks not represented in FIG. 1. Magnetic flux reversals are recorded in clock track 21 at uniform intervals of space along its circumference. A readhead 23 recovers from clock track 21 clock pulses corresponding to the flux reversals. Readhead 23 is coupled to a clock pulse former 24, which serves to shape the clock pulses recovered from clock track 21. The output of clock pulse former 24 is coupled to the input of a variable divider 25 and to a control circuit 26 which is part of a digital computer. The output of divider 25 is coupled through a gate 30 to the control or shift input of a shift register 31. Shift register 31 receives data in parallel from the digital computer and retransmits such data serially under the control of the pulses applied to its shift input. The output of divider 25 is also coupled through a gate 32 to the control or stepping input of a clock pulse counter 33. the state of clock pulse counter 33 is initially set as specified by data received from the digital computer memory and advances responsive to each pulse thereafter applied to its control input. Control circuit 26 controls gates 30 and 32.

In addition to control circuit 26, the digital computer includes an operation register 34, an address register 35, an address counter 36, a computer memory 37, an adder 38, and an accumulator 39, all of which are conventional digital computer components that operate in the usual manner to execute the instructions of a program.

Computer memory 37 includes a replaceable read-only section represented by a dashed line. Preferably, the replaceable read-only section is contained on one or more component cards containing memory elements that are connected to the remainder of memory 37 so the information they store cannot be erased. The program to be executed by the digital computer, including instructions and associated data, is stored in the read-only section of memory 37. When a change in the address format is desired, the read-only section is simply replaced with another read-only section having the program that generates the new address format. Thus, the address generator of FIG. 1 is universal in the sense that the address format for any model of disc file system, regardless of the manufacturer, ca be generated simply by replacing the read-only section of memory 37. In the case of a disc file system having multiple faces and information zones, the address format for each zone could be stored in a separate read-only section or the program of the formats for all the faces and zones of a particular model disc file system could be stored in the same replaceable read-only section. In the latter case, separate inputs to the digital computer are provided to indicate the face and zone for which the addresses are to be generated. The zone and face inputs are routed to the memory as shown by the dashed lines.

Address counter 36 is connected to the output of memory 37 for receiving therefrom initially at the beginning of the program the address of the first instruction of the program. Thereafter, the state of address counter 36 is advanced after the execution of each instruction responsive to control circuit 26 to designate the address in memory 37 of the next instruction in the program. If and when a branch occurs in the program, a new address from memory 37 is coupled to address counter 36. In summary, address counter 36 operates in the usual manner to provide in sequence the addresses of the instructions required to generate the address data. Address register 35 is also connected to the output of memory 37 to receive therefrom the addresses of data to be read from or written into memory 37 in the course of the execution of the instructions. The reading and writing operations of memory 37 are controlled by control circuit 26. The instructions read from memory 37 under the control of address counter 36 are coupled to operation register 34. Responsive to the particular instruction stored in register 34, control circuit 26 generates the sequential control pulses required to execute the instruction in the usual manner. These control pulses are synchronized to the recovered clock pulses.

It is assumed that the components of the digital computer, with the exception of adder 38, operate upon eight bit words that are transferred from one component to the other in parallel. The output of memory 37 is coupled to adder 38 and accumulator 39. One-half of each word from the output of memory 37, comprising four bits, is coupled directly to accumulator 39, and the other half of each word from the output of memory 37 comprising four bits is coupled to adder 38. The output of adder 38, comprising four bits, is coupled to the right half of accumulator 39. The selection of which half word is coupled to the adder, and which half to the left half of the accumulator is controlled responsive to an instruction. The output of accumulator 39 is coupled to the input of memory 37 and to adder 38. Adder 38 adds or subtracts the right half of the output of accumulator 39 to or from the other half of the output of memory 37. This arrangement permits various manipulations to be conveniently undertaken in the course of the computation of address data items. For example, a code can be stored in the left half of accumulator 39 which is a function of the right half of accumulator 39. The two half words of the accumulator may be sent directly to memory, or interchanged and then sent to the memory.

The output of memory 37 is also coupled to the count set input of clock pulse counter 33 and to the data input of shift register 31.

In operation, when control circuit 26 senses the first clock pulse after the gap and starts the operation of the digital computer, the first instruction is the LBT instruction. Responsive to the LBT instruction, a data word representing the predetermined number of clock pulses is read from memory 37 and coupled to the set input of clock pulse counter 33, thereby setting it to a state representing a predetermined number of clock pulses. Gate 32 is opened by control circuit 26 at the end of the LBT instruction and remains open until clock pulse counter 33 advances to its end state. The density at which the address data is to be recorded is determined by the divisor of divider 25. For example, if the divisor is 1, the address data is recorded at the same bit frequency as the clock pulses, and if the divisor is 2, it is recorded at one-half the bit frequency of the clock pulses. Assuming the divisor of divider 25 is 1, each clock pulse recovered from clock track 21 advances the state of counter 33. While this takes place, the digital computer continues to execute the instructions in sequence until the first address data item is generated. Then the digital computer stops momentarily responsive to a HALT instruction. The digital computer remains inactive after the HALT instruction until counter 33 is advanced to its end state, at which time it commands control circuit 26 to resume the sequence of instructions. The next instruction to be executed by the digital computer is the LSR instruction. Responsive to the LSR instruction, the first address data item is coupled from the output of memory 37 to the input of shift register 31, and shifted serially out of shift register 31 to a writehead 40 that records in address track 22 flux reversals representing the address data in address track 22. Assuming again that the divisor of divider 25 is 1, the bits of the address data item are shifted out of register 31 in turn, responsive to each clock pulse under the control of control circuit 26. Gate 30 is opened by control circuit 26 at the end of the LSR instruction and remains open until all the data is shifted out of register 31.

Although the invention has been disclosed in connection with a disc file memory system, it has general applicability to movable memory systems having clock tracks in predetermined positional relationship to the data to be recorded. For example, the storage medium would not have to rotate, move at constant speed, or move continuously. Further, some aspects of the invention are generally applicable to the generation by a computer of data in groups separated by long intervals. Depending on the nature of the computer used to practice the invention, shift register 31 and counter 33 could also be part of the computer per se.

What is claimed is:

1. In an address writing system having address generating means responsive to applied clock signals for sequentially generating address data items to be written at spaced predetermined locations in an address track of a moving information storage medium, wherein the number of applied clock singals required by said address generating means for generating an address data item is variable, the improvement comprising:

writing means responsive to said address generating means for sequentially writing address data items in said address track of said storage medium;

clock means for producing a series of clock signals synchronized with the movement of said storage medium, said clock means including divider means for selectively providing either said clock signals or a submultiple thereof, said clock signals being applied to said address generating means and to said writing means; and settable counting means coupled to said divider means and operative to count said clock signals and, after a variable predetermined number of clock signals have been counted following setting of said counting means by said address generating means at the beginning of and during the generation of each address data item, to initiate said writing means to begin writing of the generated address data item at a predetermined location of said address track and also to initiate said address generating means to begin generation of the next address data item to be written in said address track, wherein the time represented by said predetermined number of clock signals to which said counting means is set at the beginning of the generation of each address data item is greater than the time required for generation thereof by said address generating means.

2. The invention in accordance with claim 1, wherein said writing means includes storing means for storing an address data item generated by said address generating means prior to the time at which the address data item is to be written in said track.

3. The invention in accordance with claim 2, wherein said writing means includes means for serially shifting out an address data item stored in said storing means in response to said clock signals for writing at said predetermined location of said track.

* * * * *

UNITED STATES PATENT AND TRADEMARK OFFICE
CERTIFICATE OF CORRECTION

PATENT NO. : 4,165,531
DATED : August 21, 1979
INVENTOR(S) : Peter L. Krause

It is certified that error appears in the above-identified patent and that said Letters Patent are hereby corrected as shown below:

Col. 4, line 42, change "start" to --state--.
Col. 7, line 23, change "ca" to --can--.
Col. 9, line  9, change "singals" to --signals--.

Signed and Sealed this

Thirteenth Day of November 1979

[SEAL]

Attest:

RUTH C. MASON
Attesting Officer

LUTRELLE F. PARKER
Acting Commissioner of Patents and Trademarks